United States Patent [19]
Hoyt et al.

[11] 4,174,633
[45] Nov. 20, 1979

[54] BOTTLE TESTING APPARATUS

[75] Inventors: Donald A. Hoyt, Fulton; Harold L. Fischer, New Haven, both of N.Y.

[73] Assignee: Fulton Tool Co., Inc., Fulton, N.Y.

[21] Appl. No.: 889,882

[22] Filed: Mar. 24, 1978

[51] Int. Cl.² .......................................... G01D 21/00
[52] U.S. Cl. ............................... 73/432 R; 33/169 C
[58] Field of Search .................... 73/432 R; 33/169 C, 33/172 D; 209/523, 598

[56] References Cited
U.S. PATENT DOCUMENTS

| 3,101,147 | 8/1963 | Fry et al. | 209/598 X |
| 3,916,694 | 11/1975 | Loos et al. | 73/432 R |

*Primary Examiner*—Jerry W. Myracle

*Attorney, Agent, or Firm*—Bruns & Jenney

[57] ABSTRACT

Apparatus for inspecting bottles to determine if the bottle opening is properly aligned with its base whereby the bottle can be safely handled in automatic processing equipment. The apparatus includes a horizontal platform for positioning a bottle thereupon in an upright position, a frame mounted over the platform, a pair of carriages slidably suspended from the frame so as to move along independent paths of travel that are parallel with the horizontal platform but angularly offset in reference to each other, a probe supported in one of the carriages that is receivable in the bottle opening in contact with the inner wall thereof and means to detect the displacement between carriages as the bottle is rotated upon the platform.

8 Claims, 3 Drawing Figures

BOTTLE TESTING APPARATUS

BACKGROUND OF THE INVENTION

This invention relates to means for determining the angular displacement of the vertical axis of a bottle in reference to its base.

Typically, in most beverage processing plants or the like, bottles are filled by means of automatic high speed machines. During the filling process the individual bottles are arrested in a vertical position against a positioning stop. A filler tube is then brought down into the bottle opening and a metered amount of fluid dispensed therein. It has been found that the opening of a defectively formed bottle may be offset in reference to the center of its base whereby the bottle "leans" to one side of its vertical axis. The amount of lean can be relatively high whereby a filler tube, rather than being passed into the bottle opening, will be brought down against the neck of the bottle. In the case of a glass bottle, the bottle will be shattered. A deformable plastic bottle, on the other hand, will generally become forced or wedged within the filler tube. In any event, the production line must be shut down while the equipment is cleaned, inspected and/or repaired. This, of course, is a time consuming operation which usually proves to be costly.

Heretofore, a number of devices have been devised for inspecting bottles for excessive lean in an attempt to avoid breakage problems during filling. These inspection devices, for the most part, have not proven to be wholly satisfactory in actual use. In operation, the devices are difficult to set up, subject to misalignment and susceptible to human error. Moreover, most of the inspection devices known in the prior art utilize the outside surface of the bottle's neck as the critical reference point in the inspection process. Because the neck of most bottles is relatively thick, it is highly likely that the outside surface of the neck can be within prescribed limits while the opening contained therein is out of tolerance.

SUMMARY OF THE INVENTION

It is therefore an object of the present invention to improve equipment for inspecting bottles.

Another object of the present invention is to detect the amount of lean that is built into a bottle prior to processing the bottle in an automatic machine.

A further object of the invention is to enhance the automatic processing of bottles by accurately identifying defective bottles prior to their being processed.

A still further object of the present invention is to prevent bottle breakage as they are being filled in an automatic machine.

Yet another object of the present invention is to reduce the affects of human error in the inspection of bottles.

These and other objects of the present invention are attained by means of an inspection device that includes a horizontal plate having a holding fixture for engaging the base of a bottle so that it can be rotated about its center in an upright position, a frame mounted over the platform in which two carriages are slidably supported so as to move along independent paths of travel that are parallel with the plate and angularly offset in relation to each other, a probe mounted in one of the carriages which is receivable in the bottle opening in contact with the inner wall thereof and a gage for detecting the amount of displacement between carriages as the bottle is rotated in position upon its base.

BRIEF DESCRIPTION OF THE DRAWINGS

For other objects and further details of the invention, reference is had to the following description of the invention which is to be read in conjunction with the accompanying drawings, wherein.

DESCRIPTION OF THE INVENTION

Figure 1:
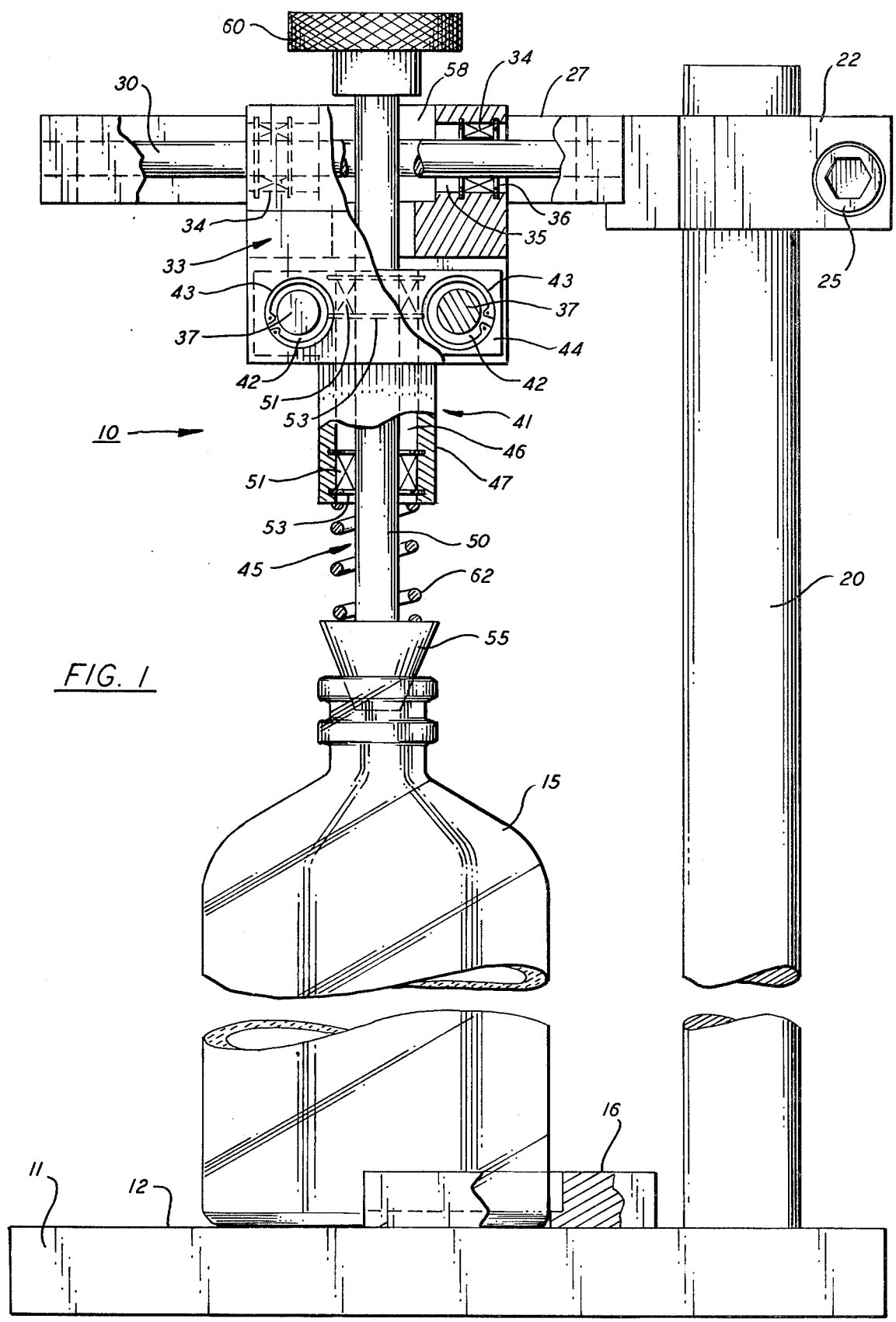
FIG. 1 is a front elevation with portions broken away illustrating inspection apparatus embodying the teachings of the present invention.

Referring now to the drawings, there is shown an inspection tool, generally referenced 10, for examining cylindrical bottles in order to determine if the bottle can be safely handled and processed in automatic equipment, such as a beverage filling and packaging machine. As noted above, one of the main defects found in bottles of this nature involves a characteristic generally referred to as lean. Lean can be defined as the angular displacement of the major axis of the bottle from the vertical when the base of the bottle is seated in a horizontal plane. For purposes of this disclosure the major axis of the bottle will be the axis that passes through the center of the bottle base and also the center of the bottle opening. As can be seen, when the amount of lean is excessive, the location of the opening can be well beyond the allowable limits provided for in most automatic filling machines. Early detection of such defective bottles can result in considerable savings in time and money.

As will become apparent from the disclosure below, the present apparatus is a precision tool and, as such, it is built to relatively close tolerances to provide for the accurate location and the precise movement of its component parts. The instrument is supported upon a base plate or platform 11 having a flat horizontal working surface 12 adapted to seat bottle 15 thereupon in an upright position while it is undergoing examination. A bottle positioning fixture 16 is mounted upon the top surface of the base and secured in place by means of cap screws 17—17. The fixture includes a V-shaped mounting frame having two vertically extending locating surfaces 18,19 which, in operation, are arranged to engage the base of a bottle mounted therein. The vertical wall of each locating surface is cut back sufficiently so that the surfaces engage only the base section of the bottle; the height of the surface being generally equal to or less than the thickness of the base. By this arrangement, a bottle that is seated upon the base, and which is rotated against the locating surfaces of the fixture, will be caused to turn about the center of its base.

A vertical support column 20, which is anchored or otherwise secured to the base, extends upwardly to an elevation that is greater than the height of the bottle being inspected. A movable support collar 22 encircles the column and is provided with a split bushing 23 that affords a close running fit with the column whereby the collar may be vertically repositioned along the length of the column. A vertical slot 24 is machined through the back wall of the collar into the bushing opening to provide sufficient flexibility to permit the collar to be clamped against the post. A clamping screw 25 is threaded into hole 26 passing through the back of the collar normal to the vertical slot. By tightening the bolt, the collar can be securely locked against the column at a desired elevation.

A rectangular frame 27 is mounted in cantilevered fashion from the collar and secured in the L-shaped receiving surface therein by means of recessed screws 28—28. In assembly, the frame extends outwardly in a horizontal direction from the collar and is suspended over the bottle seated upon the platform. A pair of parallely aligned circular guide rails 30—30 are secured in two opposed side walls 31 and 32 of the frame by any suitable means. Both rails are accurately located in assembly so that they are in parallel alignment with the horizontal working surface 12 of the platform.

A first, generally U-shaped carriage 33 is slidably suspended upon guide rails 30—30 by means of linear bearings 34—34 secured within openings 35 formed in the carriage via retaining rings 36. A second pair of parallely aligned circular rails 37—37 are slidably supported within the two arms 39-40 of the carriage 33. The second pair of rails, as in the case of the first pair, are accurately mounted in the carriage so that they are both in parallel alignment with the horizontal working surface 12 of the platform. The two pair of rails, however, are arranged so that they are perpendicularly aligned in respect to each other.

Figure 2:
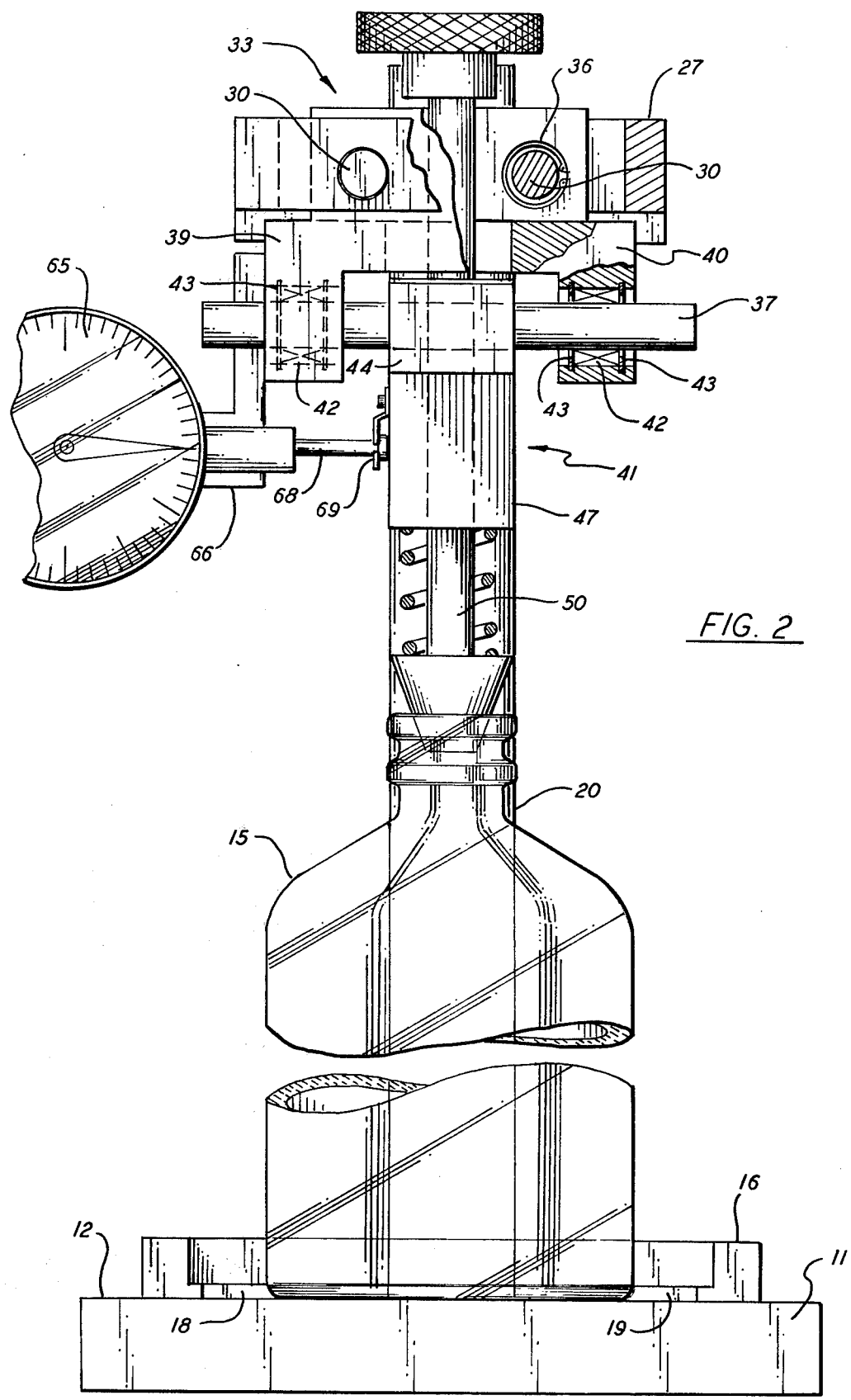
FIG. 2 is a side elevation with portions broken away of the apparatus illustrated in FIG. 1.
Figure 3:
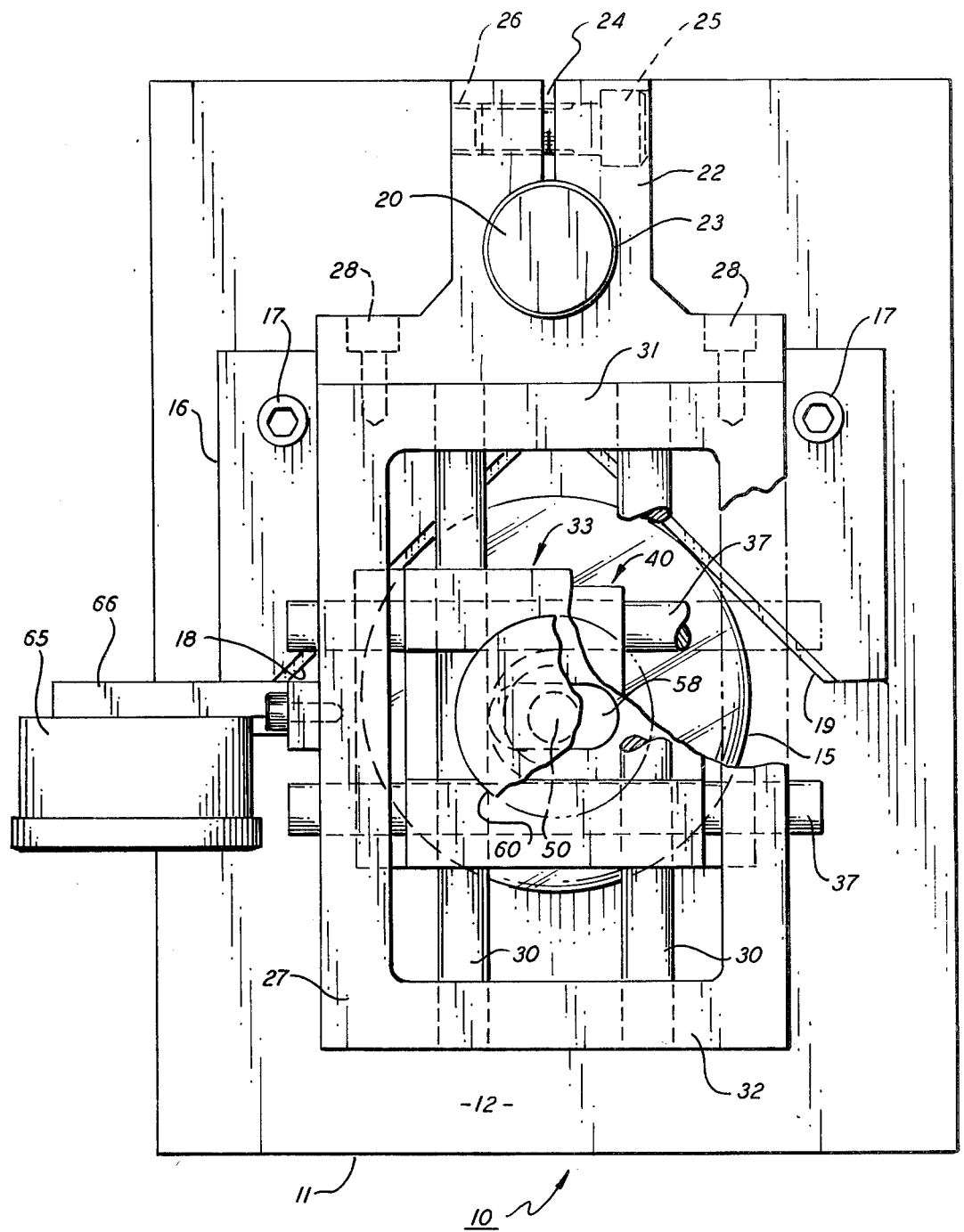
FIG. 3 is a top plan view with portions broken away also showing the apparatus of FIG. 1.

A second T-shaped carriage 41 is suspended below the first carriage with the rails 37—37 being secured in the horizontal leg 44 of the tee. As best illustrated in FIG. 2, the rails are slidably supported within linear bearing 42—42 secured in arms 39 and 40 of the first carriage via retaining rings 43. An elongated probe, generally referenced 45, is slidably carried within an opening 46 provided in the vertical leg 47 of the tee. The shaft 50 of the probe is mounted for vertical movement within linear bearing 51—51 secured in the opening 46 by retaining rings 53.

The distal or downwardly extended end of the probe shaft is provided with a tapered plug 55 that can be inserted into the opening of a bottle positioned upon the platform 11. Although the plug may take any suitable form, it is herein illustrated as being an inverted truncated cone wherein the small diameter end of the cone is receivable within the bottle opening with its side wall in contact with the inner wall of the opening. The opposite end of the probe shaft passes upwardly through an elongated opening 58 formed in the central portion of the first carriage and terminates with an enlarged depending knurlled head 60. Sufficient clearance is provided between the elongated opening and the probe shaft to permit the two carriages to move along their independent paths of travel as a bottle is being inspected.

A biasing spring 62 encompasses the lower end of the probe shaft and is adapted to act between the second carriage and the plug to urge the probe downwardly toward the base plate. Normally, when there is no bottle positioned upon the inspection platform, the spring will pull the head of the probe down into seating contact against the top surface of the first carriage. However, with the plug inserted into a bottle opening as shown, the head of the probe is lifted from the first carriage and the carriage is thus free to move or glide upon rails 30—30.

Referring now more specifically to FIG. 2, a dial indicator gage 65 is secured to the side wall of leg 39 of the U-shaped carriage 33 by means of a mounting bracket 66. The movable plunger arm 68 of the gage is also secured to the side wall of the second T-shaped carriage by a smaller mounting bracket 69. As can be seen, by this arrangement, the dial indicator will continually monitor the displacement between the two carriages as they move parallel to the horizontal surface of the base along their respective paths of travel.

With a bottle seated on the working surface of the platform, with its base in contact with the vertical locating surfaces of the frame, the plug is inserted into the bottle opening where it is held in place under the biasing force of spring 62. At this time, the two carriages will move freely in response to the plug insertion and each will assume some start of test position in relation to the other. The exact start of test position is not important provided the gage reading is noted or the dial is set to a zero reading. The bottle is now rotated through 360° while its base remains in contact with the locating surface of the fixture. As a result of this rotation, the elevated bottle opening is also caused to rotate through one complete revolution. In the event that there is no lean built into the bottle, the center of rotation of the opening will be coaxially aligned with the center of rotation of the base and, as a result, the probes horizontal position will remain unchanged. Accordingly, the relative positions of the carriages will remain stationary and the gage indicator will also remain stationary.

If, however, the bottle does possess some degree of lean, no matter how slight, the probe will be horizontally displaced as the bottle is rotated through one complete revolution. Because of the manner in which the two carriages are suspended from the frame, the carriages will cooperate to follow the motion described by the displaced probe. In the case where the paths of travel of the carriages are normal to each other, as set forth above, a maximum displacement substantially equal to maximum displacement of the center of the bottle opening in respect to the center of the base is registered by the dial. This reading is clearly indicative of the amount of lean present in the test bottle. If the lean is outside of allowable limits the bottle is rejected and is thus prevented from being smashed or otherwise destroyed in the downstream processing equipment.

It should be further noted that although the two paths of travel of the carriages are herein described as being perpendicularly aligned, they do not necessarily have to be so and sufficient angular displacement to provide accurate gage readings is all that is required. Similarly, the carriages can be mounted upon one or more rails and the rails can take any suitable cross-sectional form without departing from the teachings of the present invention. While this invention has been described with reference to the structure disclosed herein, it is not confined to the details set forth above and this application is intended to cover any modificatons or changes that may come within the scope of the following claims.

We claim:
1. Apparatus for inspecting bottles including
  a horizontal support platform having a locating fixture thereon for engaging the base of a bottle positioned on the platform and supporting the bottle in an upright position thereupon,
  a frame mounted over the platform having a first carriage slidably mounted therein so as to move along a first path of travel parallel to the base,
  a second carriage slidably mounted in the first carriage so as to move along a second path of travel that is also parallel to the base and which is angularly offset from the first path of travel, a probe affixed to the second of said carriages for movement therewith having a plug insertable within a bottle opening in contact with the inner wall thereof, and means for detecting the displacement between the carriages as a bottle is rotated about its base upon the platform.

2. The apparatus of claim 1 wherein said first carriage is mounted upon at least one rail supported in the frame and said second carriage is mounted upon at least one rail supported in the first carriage.

3. The apparatus of claim 2 wherein the paths of travel defined by the rails are substantially normal to each other.

4. The apparatus of claim 1 wherein said plug is a truncated cone which is supported upon a shaft extending downwardly from said second carriage so that the small diameter end of the probe is insertable in the bottle opening.

5. The apparatus of claim 4 wherein said shaft is slidably supported in said second carriage for movement in a vertical direction between a fully extended position and a fully retracted position.

6. The apparatus of claim 5 further including biasing means acting between the second carriage and the probe to urge the probe into the fully extended position.

7. The apparatus of claim 1 wherein said frame is adjustably mounted upon a vertical standard and further includes clamping means to support the frame upon the standard in a desired position.

8. The apparatus of claim 1 wherein said locating fixture is a V-shaped frame with the two legs of the frame arranged to contact the base of a bottle seated upon the platform.

* * * * *